United States Patent
Schumann et al.

(10) Patent No.: US 9,731,500 B2
(45) Date of Patent: Aug. 15, 2017

(54) METHOD FOR TESTING THE RELIABILITY OF ERROR DETECTION OF AN IMAGE INSPECTION METHOD

(71) Applicant: HEIDELBERGER DRUCKMASCHINEN, Heidelberg (DE)

(72) Inventors: Frank Schumann, Heidelberg (DE); Frank Soltwedel, Sinsheim/Hoffenheim (DE); Daniel Blatt, Roetgen-Rott (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 127 days.

(21) Appl. No.: 14/674,149

(22) Filed: Mar. 31, 2015

(65) Prior Publication Data

US 2015/0273816 A1     Oct. 1, 2015

(30) Foreign Application Priority Data

Mar. 31, 2014   (DE) .................. 10 2014 004 556

(51) Int. Cl.
  *B41F 33/00* (2006.01)
  *G06K 9/03* (2006.01)
  *H04N 1/00* (2006.01)
  *G06T 7/00* (2017.01)

(52) U.S. Cl.
  CPC .......... *B41F 33/0036* (2013.01); *G06K 9/036* (2013.01); *G06T 7/001* (2013.01); *H04N 1/00005* (2013.01); *H04N 1/00015* (2013.01); *H04N 1/00045* (2013.01); *G06T 2207/10004* (2013.01); *G06T 2207/10008* (2013.01);

(Continued)

(58) Field of Classification Search
  CPC ..... B41F 33/0036; G06K 9/036; G06T 7/001; G06T 2207/10004; G06T 2207/10008; G06T 2207/10024; G06T 2207/30144; G06T 2207/30176; H04N 1/00005; H04N 1/00015; H04N 1/00045
  See application file for complete search history.

(56) References Cited

U.S. PATENT DOCUMENTS 6,373,964 B1 *  4/2002  Geissler .............. B41F 33/0045
                                              356/237.1
6,501,086 B1 * 12/2002  Leuenberger ............ D06H 3/08
                                              250/559.45

(Continued)

FOREIGN PATENT DOCUMENTS

| DE | 10065321 A1 | 7/2002 |
| EP | 2700505 A2 | 2/2014 |
| WO | 0006823 A1 | 2/2000 |

*Primary Examiner* — Stephen R Koziol
*Assistant Examiner* — Pinalben Patel
(74) *Attorney, Agent, or Firm* — Laurence A. Greenberg; Werner H. Stemer; Ralph E. Locher

(57) ABSTRACT

A method for testing the reliability of an error detection of an image inspection method by using a computer includes producing a defective test image by superposing specific error elements on an error-free reference image, carrying out the image inspection method with the defective test image, comparing the errors found by the image inspection method with the error set to be expected with the aid of the known errors added to the test image, and evaluating the reliability of the image inspection method with the aid of the difference between found and expected errors.

8 Claims, 2 Drawing Sheets

(52) U.S. Cl.
CPC ............... *G06T 2207/10024* (2013.01); *G06T 2207/30144* (2013.01); *G06T 2207/30176* (2013.01)

(56) References Cited

U.S. PATENT DOCUMENTS

| | | | | |
|---|---|---|---|---|
| 6,683,995 | B2* | 1/2004 | Ford | H04N 1/4097 |
| | | | | 382/199 |
| 7,262,880 | B2* | 8/2007 | Geissler | B41F 33/00 |
| | | | | 358/1.9 |
| 7,340,086 | B2 | 3/2008 | Werzinger | |
| 7,570,797 | B1* | 8/2009 | Wang | G01N 21/9501 |
| | | | | 250/559.45 |
| 8,654,398 | B2* | 2/2014 | Dewancker | H04N 1/40 |
| | | | | 358/1.9 |
| 9,317,914 | B2* | 4/2016 | Kitai | G06T 7/0002 |
| 9,595,091 | B2* | 3/2017 | Kaizerman | G06T 7/0004 |
| 2005/0286742 | A1* | 12/2005 | Rasmussen | B41J 29/393 |
| | | | | 382/112 |
| 2007/0223789 | A1* | 9/2007 | Diederichs | G07C 3/146 |
| | | | | 382/112 |
| 2011/0110578 | A1* | 5/2011 | Longo | G06T 7/0002 |
| | | | | 382/144 |
| 2011/0149331 | A1* | 6/2011 | Duggan | G06K 9/036 |
| | | | | 358/1.14 |
| 2013/0114102 | A1* | 5/2013 | Yamamoto | G06K 9/3216 |
| | | | | 358/1.14 |
| 2015/0269719 | A1* | 9/2015 | Kitai | H04N 1/04 |
| | | | | 358/474 |

* cited by examiner

METHOD FOR TESTING THE RELIABILITY OF ERROR DETECTION OF AN IMAGE INSPECTION METHOD

CROSS-REFERENCE TO RELATED APPLICATION

This application claims the priority, under 35 U.S.C. §119, of German Patent Application DE 10 2014 004 556.0, filed Mar. 31, 2014; the prior application is herewith incorporated by reference in its entirety.

BACKGROUND OF THE INVENTION

Field of the Invention

The present invention relates to a method for testing the reliability of error detection in an image inspection method using a computer.

The invention belongs to the technical field of test automation.

In the prior art to date, the image inspection method to be tested is used in the course of carrying out a printing job in order to check the finished printed products for possible errors. In the process, the printed images are scanned by using a digital camera, sent to a server and compared there with a reference image produced from prepress data or with a printed reference image. Depending on the parameterization of the comparing algorithm, deviations between the re-digitized printed image and the reference image are detected in that case and displayed as errors. An automated checking of the image inspection does not take place. In order, nevertheless, to detect possible errors in the image inspection which could result in defective prints not being detected, printing plates are produced which are filled with various error objects—also termed error plates. That is to say, the printing plates include error elements such as, for example, point sequences, texts with commas and points or point ramps which provoke printing errors upon printing with the plate. The printing errors are investigated in the course of the image inspection method. It is thereby possible to test whether or not the image inspection method is still functioning correctly, that is to say is still correctly parameterized. However, that procedure is very complicated, since such a test of the image inspection method additionally requires the preparation of a dedicated printing plate and, moreover, the actual printing job must be interrupted during the carrying out of the test. Automating the test method would both massively accelerate the printing process itself, and reduce the costs of carrying it out.

Automated test systems are applied in many areas, in particular in software development. One example is the development of control devices in the automotive sector. In that case, the control devices, the task of which is to acquire sensor data, evaluate them and drive actuators as a function thereof, are subjected to very varied test scenarios. On one hand, the scenarios include hardware damage such as, for example, cable breaks or short circuits in the supply cables or specific connecting cables. On the other hand, data errors are tested. For example, the errors may be due to damaged or failed sensors which supply values outside the measuring range or due to actuators which are no longer able to respond. Even if sensor values contradict one another, that must be detected by the control device. All of the error categories can be combined with one another at will in an automated test system. The control device must detect the errors and respond correctly thereto in accordance with how it is programmed. The use of automated test systems enables possible errors in programming and/or the configuration to be detected at an early stage and eliminated. Savings are thereby made both in time and in costs which would otherwise need to be applied massively in the subsequent search for errors in a device already in the field.

SUMMARY OF THE INVENTION

It is accordingly an object of the invention to provide a method for the automated testing of the reliability of the error detection of an image inspection method, which overcomes the hereinafore-mentioned disadvantages of the heretofore-known methods of this general type and in which possible errors in the function of the image inspection, for example as a consequence of faulty parameterization, or of a defect or incorrect installation of the measuring device, are detected at an early stage.

With the foregoing and other objects in view there is provided, in accordance with the invention, a method for testing the reliability of the error detection of an image inspection method by using a computer, which comprises the following steps:
1. producing a defective test image by superposing specific error elements on an error-free reference image;
2. carrying out the image inspection method with the defective test image;
3. comparing the errors found by the image inspection method with the errors which have been added to the test image; and
4. evaluating the reliability of the image inspection method with the aid of the difference between the found and the expected errors.

In this process, the defective test image is produced subsequent to the creation of the reference image, which is produced from the known prepress data of the printing job. The facts concerning how many of the errors scattered into the test image through the error elements have been found by the image inspection then indicate whether or not the filter parameters of the image inspection method are still correctly set. The advantage is that the printer obtains immediate feedback on the quality of the image inspection. He or she can therefore intervene immediately in the event of error, reset the inspection method, or eliminate the error and thus reduce possible wastage. Since, in addition, there is no longer a need to produce error plates, that is to say a printing plate with prescribed errors for testing the inspection system for the prescribed errors, the creation and use of which increase the time for carrying out the overall printing process, there is a reduction both in time and outlay. As a result, it becomes possible, in addition, to test the image inspection method much more frequently and therefore to detect deviations at an earlier stage than has been possible with the state of the art to date.

Another preferred development of the method according to the invention is, in this case, that the reliability test is an optional component of the image inspection method to be tested which can be activated and deactivated manually by the user. That is to say, the printer can include the test method at will, depending on the complexity of the printing job. A printed image with great complexity places higher demands on the image inspection method, and thereby also requires a more frequent checking thereof.

A further preferred development of the method according to the invention is, in this case, that the image inspection method with the reliability test is a component of a printing process for a printing machine. That is to say, the image inspection method is used to check the quality of printed products, and the test method to be applied for is optimized for this purpose. In this case, the printed pages are detected by using a digital camera integrated in the printing machine, and then transmitted to a computer (server) connected by a network, and matched there with a reference image.

An added development of the method according to the invention is, in this case, that the error-free reference image results from the prepress data of the printing job. The reference image is therefore the image which results from the inputs of the customer data relating to image content, image configuration and image format. The image is both presented to the customer for confirmation of the printing job, and used in the printing process to check quality. Alternatively, it is also possible for the reference image to be the printed image printed and scanned during the printing job. In this case, the specific error elements are then superposed on a scanned, preferably error-free printed image, and the defective test image is thus produced.

An additional preferred development of the method according to the invention is that the error elements constitute points or areas of the most varied sizes and configurations. The reference image is superposed on the point clouds, point ramps or areas of the most varied geometric shapes, and the error image to be tested results therefrom.

Yet another preferred development of the method according to the invention is that the testing method tests the image inspection method for the detection of very varied errors such as different error sizes, contrasts in the superposition or the lack of color. The error types must be detected by the image inspection. The type and frequency of their occurrence may be controlled by the selection of appropriate error elements on which the reference image is to be superposed.

Yet a further preferred development of the method according to the invention is that a manual and/or automatic reparameterization of the image inspection method is carried out if the reliability of the image inspection method does not correspond to the criteria set in advance. This ensures that the image inspection method is configured and calibrated anew in the event of excessively large deviations. Otherwise, it would not be ensured that all errors which occur during actual printing would be found.

A concomitant preferred development of the method according to the invention is that the method runs in the background on the computer automatically, at least at specific time intervals. It is ensured thereby that the user of the printing machine does not forget to carry out the test for reliability of the error detection regularly. It can be provided in this case that a test is always carried out during a printing job, specifically whenever the test does not disturb the printing operation. If it is established in the test that an error is present, the operator is informed optically or acoustically. The operator need not give thought to the functionality of his or her image inspection system, because he or she is informed automatically in the case of an error.

The method and functionally advantageous developments thereof are described in more detail below with reference to the associated drawings with the aid of at least one preferred exemplary embodiment. Mutually corresponding elements in the drawings are provided in each case with the same reference symbols.

Other features which are considered as characteristic for the invention are set forth in the appended claims.

Although the invention is illustrated and described herein as embodied in a method for testing the reliability of error detection of an image inspection method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
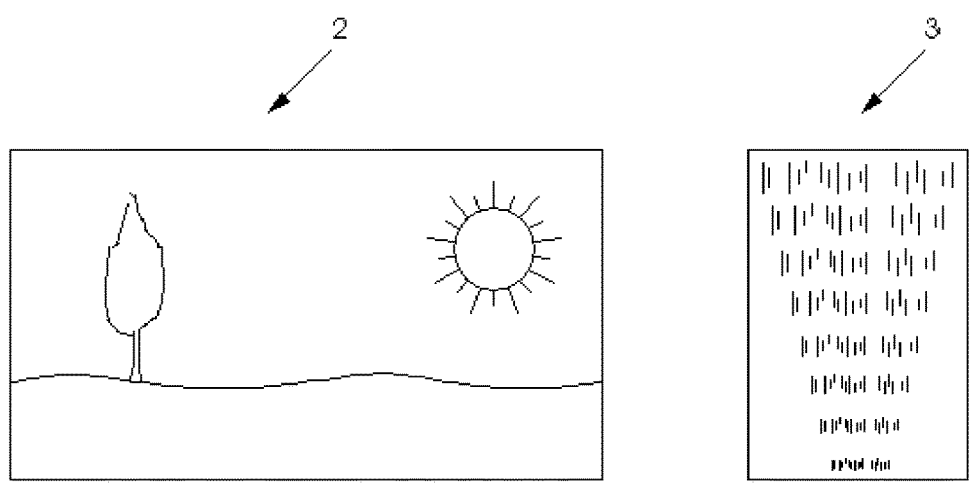
FIG. 1 is a diagrammatic, plan view of an example of an image with an error element.
Figure 2:
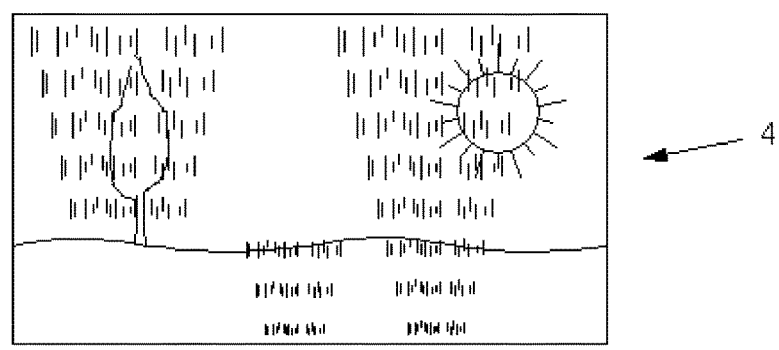
FIG. 2 is a plan view of images showing how a simulated error image arises.
Figure 3:
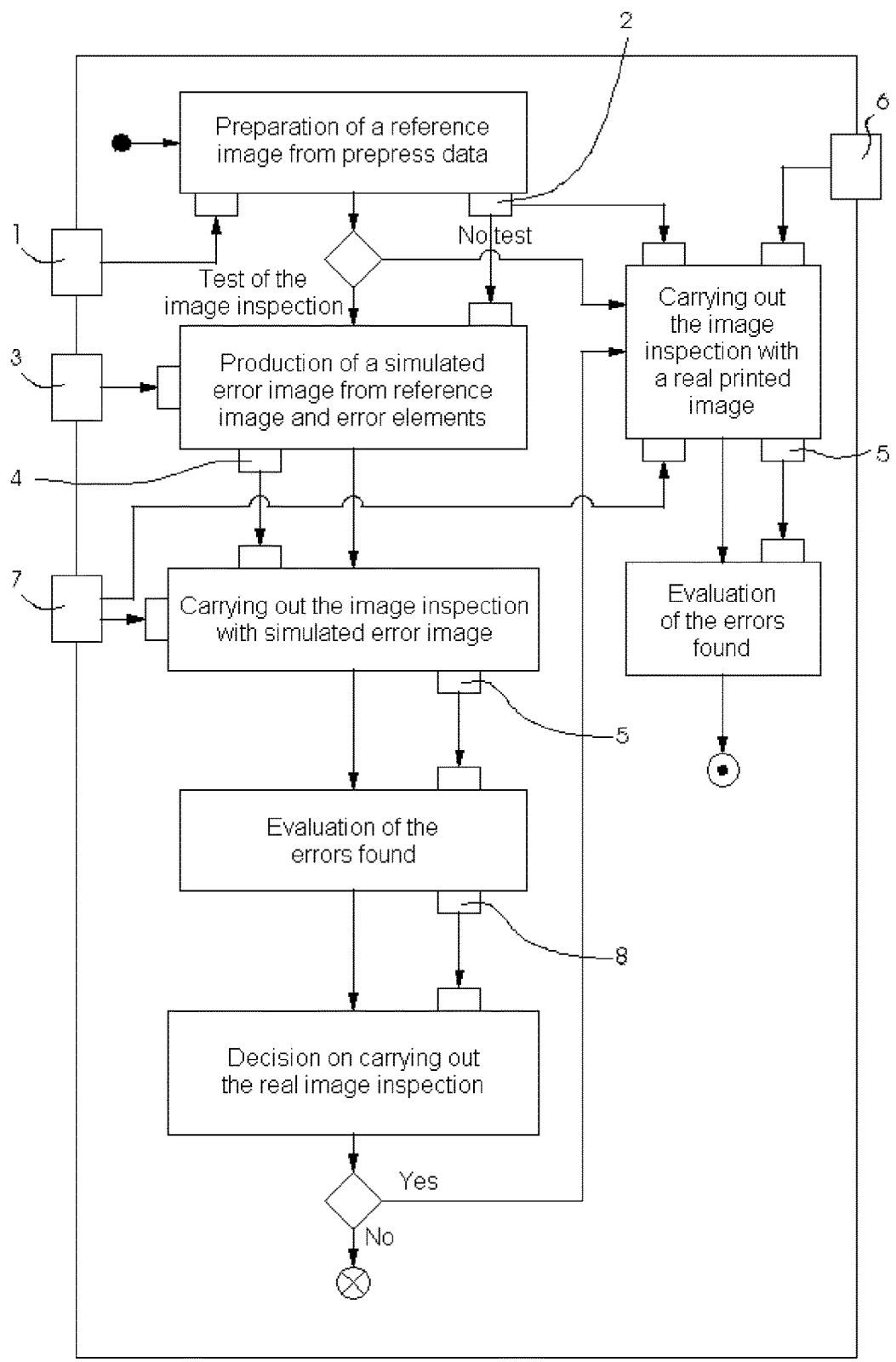
FIG. 3 is a flow diagram showing the sequence of the test method.

Referring now in detail to the figures of the drawings as a whole, there is seen a preferred exemplary embodiment of the invention which is described below. Existing graphics application software controls and monitors an image inspection. Added thereto is a new menu item through which a user activates and deactivates a test method. An exemplary sequence is illustrated in FIG. 3. When the present printing process is activated for the first time, a defective test image 4 is produced from a reference image 2 and previously selected error elements 3, which are stored in the software, by superposing. The reference image 2 is produced from prepress data 1, since it is already required for a running image inspection. The error test image 4 can also be prepared for the image inspection directly after the preparation of the reference image 2, in such a way that it is immediately ready for use upon activation of the test method. The error elements 3, illustrated in FIG. 1 by way of example, are stored in the software and can be selected by the user as a function of the desired error types. They constitute points and surfaces of the most varied sizes, configurations and contrasts. Further possibilities are color elements in the most varied values of area coverage, texts in different character types (for example Chinese/Japanese or Arabic characters) and alignments or simulations of scratches, holes, etc. Given a targeted selection of the error elements 3, it is possible to produce specific image errors by superposing with the original reference image 2 (visualized symbolically in FIG. 2). Examples are different error sizes, contrasts in the superposition or a lack of color.

In the course of a normal image inspection method, the printed images are scanned, sent to a server and matched with the reference image 2 by using diverse comparing algorithms through a program running on the server computer. Deviations are detected as errors 5, classified and indicated to the user through a display by the program which controls the image inspection method. The display can in this case be both the wall screen of the printing machine or the monitor of a separate computer through which the image inspection method is monitored by using graphics application software. Given an activated test method for the image inspection, instead of a scanned image 6 the error test image 4 which is prepared is now sent to the server. The error test image 4 is likewise matched with the reference image 2 by the program. It is important in this case that in the case of matching with the error test image 4 the image inspection method is operated by using the same settings 7 as for the matching of the scanned images 6. The errors 5 detected in the error test image 4 are compared with the expected errors, which are known with the aid of the error elements 3 on which the reference image 2 has previously been superposed. With the knowledge of the fact of how many of the incorporated errors have been detected by the algorithms, it is possible to assess how reliably the image inspection is working as test results 8. Should the reliability fall below specific criteria fixed in advance by the user, this is indicated on the display by the graphics application software. The user can then interrupt the printing process, and recalibrate the inspection method. If the setting of the image inspection method is performed automatically, the software can automatically initiate a recalibration.

The capacity of the server and/or of the program and the usability of the latter govern whether, given an activated test method, the error test image is processed in parallel with the scanned images 6 actually to be tested, for example whether the image inspection method is continued for the printed images, or whether the image inspection, and thus the printing process, must be stopped for carrying out the test method. Both variants are conceivable.

The following is a summary list of reference numerals and the corresponding structure used in the above description of the invention:

| | |
|---|---|
| 1 | Prepress data |
| 2 | Reference image |
| 3 | Error element |
| 4 | Simulated error test image |
| 5 | Inspection result |
| 6 | Digitized printed image |
| 7 | Inspection parameter |
| 8 | Test result |

The invention claimed is:

1. A method for testing the reliability of error detection of an image inspection method using a computer, the image inspection method with the reliability test being a component of a printing process for a printing machine, the method comprising the following steps:

producing a defective test image by superposing specific known error elements on an error-free reference image, the error elements constituting points or surfaces of maximally varied sizes and configurations;

carrying out the image inspection method with the defective test image;

comparing errors found in the image inspection method with an error set to be expected with the aid of the known error elements added to the test image; and evaluating the reliability of the image inspection method with the aid of a difference between the found and expected errors; and recalibrating the inspection method upon the reliability falling below a specific criteria.

2. The method according to claim 1, wherein the reliability test is an optional component of the image inspection method to be tested, which can be activated and deactivated manually.

3. The method according to claim 1, wherein the error-free reference image results from prepress data of a printing job.

4. The method according to claim 1, wherein the error-free reference image results from digital data of a scanned printed image having been produced in the printing machine in accordance with a printing job.

5. The method according to claim 1, wherein the testing method tests the image inspection method for the detection of maximally varied errors.

6. The method according to claim 5, wherein the varied errors include different error sizes, contrasts in the superposition or a lack of color.

7. The method according to claim 1, which further comprises carrying out a manual or automatic reparameterization of the image inspection method if the reliability of the image inspection method does not correspond to criteria set in advance.

8. The method according to claim 1, which further comprises automatically executing the method in the background on the computer, at least at specific time intervals.

* * * * *